Sept. 2, 1924.
E. E. KRAEMER
EXTENSION BOLT
Filed May 9, 1922
1,507,488
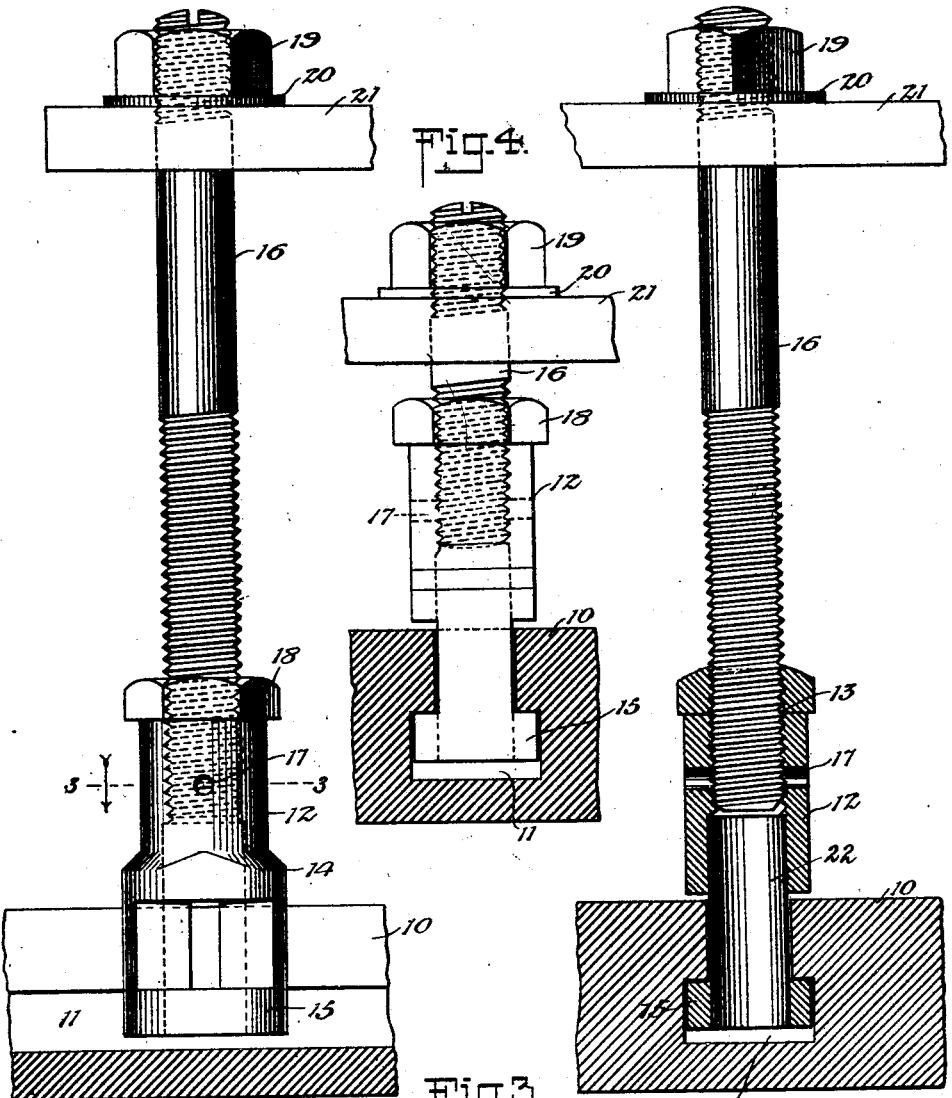
WITNESSES
INVENTOR
*Emil E. Kraemer*
BY
ATTORNEYS Patented Sept. 2, 1924.

1,507,488

UNITED STATES PATENT OFFICE.

EMIL EDWARD KRAEMER, OF HICKSVILLE, NEW YORK.

EXTENSION BOLT.

Application filed May 9, 1922. Serial No. 559,564.

*To all whom it may concern:*

Be it known that I, EMIL E. KRAEMER, a citizen of the United States, and a resident of Hicksville, in the county of Nassau and State of New York, have invented new and useful Improvements in Extension Bolts, of which the following is a full, clear, and exact description.

This invention relates to extension bolts primarily designed for use in conjunction with the slotted table of a shaper or any other machine having a slotted table.

In machine work when ordinary bolts with square heads shaped to fit the slots of a machine table are used there is always a lot of work required in changing the bolts in order to provide a bolt suited to the article that is being clamped on the table. Often the machinist neglects to change the bolts and endeavors to make use of the bolts in position in the machine table. When these bolts are too short for the work the nuts used for clamping the work in position do not get sufficient grip and the threads on the ends of the bolts are usually strained or stripped from the bolts.

The general object of this invention is the provision of a simple and durable extension bolt, for use in conjunction with the slotted tables of machines, that may be adjusted in length so as to be adapted for the clamping of articles of different sizes in position on the machine table.

A further object of the invention is the provision of an extension bolt provided with a removable shank for facilitating the changing of the shank when necessary in order to accommodate certain types of articles that it is desired to machine.

This object is accomplished by providing a sleeve with a T-shaped head formed on its lower end and having an internal thread with which a stud bolt engages so that the latter may be adjusted in the sleeve so as to give different lengths above the same, and providing means for locking the stud bolt in different positions in the sleeve.

These and other objects of the invention will be more clearly understood from the following detailed description and accompanying drawings.

Figure 1 is a side elevation of the extension bolt showing it in position in the slotted table;

Figure 2 is a side elevation of the extension bolt, similar to Figure 1, with a portion of the sleeve cut away to show the construction;

Figure 3 is a section along the line 3—3, Figure 1;

Figure 4 is a side elevation of the extension bolt with a short shank in position in the sleeve.

Referring to the above-mentioned drawings, a portion of a machine table 10 is shown with a T-slot 11 provided therein. A sleeve 12 provided with an enlarged end 14, upon which a T-shaped head is formed, is mounted in the slot 11 in the table 10. An internal thread 13 is provided in the upper end of the sleeve 12 while the lower end, as shown at 22, is unthreaded. Mounted in the sleeve 12 and engaging with the internal thread 13 of the sleeve is a stud bolt 16. This stud bolt may be adjusted in the sleeve and when screwed into the sleeve extends through the unthreaded portion 22 of the sleeve. Projecting through the walls of the sleeve 12, at a distance from the top of the sleeve equal to the length of the stud bolt 16 that should be screwed into the sleeve in order to give a proper connection, is an observation opening 17 so that the operator can observe when the stud bolt has a proper connection with the sleeve.

The length of the threaded portion of the lower end of the stud bolt 16 is greater than the threaded portion of the upper end. This allows the stud bolt to be adjusted in the sleeve 12 so as to give different lengths above the sleeve. A lock nut 18 is mounted on the lower threaded end of the stud bolt for locking the stud bolt in any desired position in the sleeve. Mounted on the upper end of the stud bolt is a nut 19, a washer 20 and a plate 21 used for clamping any article on the table 10.

Figure 4 shows the extension bolt with a very short stud bolt 16. In certain cases when the stud bolt 16 is too long and cannot be adjusted in the sleeve 12 so as to accommodate the work it may be removed from the sleeve and a stud bolt of the desired length substituted.

When using this extension bolt the head is first positioned in the slot and the stud bolt then screwed into position. The stud bolt 16 is then adjusted in the sleeve to suit the article to be clamped on the table and the lock nut 18 is tightened, locking the stud bolt in the desired position. Then by the use of the plate 21, washer 20 and the nut 19 the article is clamped tightly on the table. The operator can see through the observation opening 17 when the stud bolt 16 has a sufficient length extending into the sleeve in order to give the proper connection so that the threads on the stud bolt will not be strained or stripped from the same. By moving the T-shaped head 15 along the slot 11 the sleeve 12 may be positioned at different points on the table 10 so that the article to be worked upon may be clamped on the table in any desired position.

I would state in conclusion that while the illustrated example constitutes a practical embodiment of my invention I do not limit myself strictly to the exact details herein illustrated since manifestly the same can be considerably varied without departing from the spirit of the invention as defined in the appended claims.

Claims:

1. In combination with a table provided with T-slots, a device of the class described, comprising a sleeve having an internal opening extending longitudinally therethrough, a head formed on the lower end of said sleeve and shaped to fit into the T-slots in said table, a stud bolt for engaging in the opening in said sleeve, a lock nut mounted on the lower end of said stud bolt for locking it in position in the sleeve, and means mounted on the upper end of the stud bolt to clamp an article on the table.

2. An extension bolt of the class described for use with tables having T-slots formed therein, comprising a sleeve having an opening extending longitudinally through the sleeve, provided above the enlarged lower end thereof with an opening for observation purposes, a T-shaped head formed on the lower end shaped to fit into the T-slots, a stud bolt for engaging in the sleeve, a lock nut mounted on the stud bolt for locking it in position in the sleeve, and means mounted on the upper end of the stud bolt for clamping an article in position on the table.

EMIL EDWARD KRAEMER.